United States Patent [19]

Hinojosa et al.

[11] 4,256,446
[45] Mar. 17, 1981

[54] APPARATUS FOR MANUFACTURING PREFINISHED WALLBOARD

[75] Inventors: Servando G. Hinojosa, 1127 Lillian, Alice, Tex. 78332; Octavio G. Hinojosa, Alice, Tex.

[73] Assignee: Servando Hinojosa, Alice, Tex.

[21] Appl. No.: 10,627

[22] Filed: Feb. 9, 1979

Related U.S. Application Data

[62] Division of Ser. No. 450,281, Mar. 12, 1974, which is a division of Ser. No. 237,345, Mar. 23, 1972, Pat. No. 3,798,854.

[51] Int. Cl.³ .......................................... B29D /23/05
[52] U.S. Cl. ..................... 425/115; 264/119; 264/129; 264/284; 264/293; 425/90; 425/94
[58] Field of Search .................. 425/115, 110, 90, 94, 425/471, 811; 264/129, 284, 245, 293, 119; 101/3 SP, 5, 6, 22, 23, 32, 367; 29/110, 121.1

[56] References Cited

U.S. PATENT DOCUMENTS

| 746,786 | 12/1903 | Burdick | 101/119 |
|---|---|---|---|
| 1,493,156 | 5/1924 | Keck | 101/119 |
| 1,813,390 | 7/1931 | Dwyer | 101/3 R |
| 1,991,996 | 2/1935 | Bakker | 427/270 |
| 2,803,188 | 8/1957 | Duvall | 264/293 |
| 2,847,701 | 8/1958 | Welch | 425/90 |
| 2,873,204 | 2/1959 | Hochuli et al. | 427/275 |
| 3,154,010 | 10/1964 | Rudy | 101/3 SP |
| 3,223,576 | 12/1965 | Evans et al. | 264/129 |
| 3,235,440 | 2/1966 | Gould | 249/119 |
| 3,522,769 | 8/1970 | Preismeyer | 101/3 SP |
| 3,661,613 | 5/1972 | Contrael et al. | 428/187 |
| 3,661,688 | 5/1972 | Wheeler | 249/119 |
| 3,846,219 | 11/1974 | Kunz | 249/119 |

Primary Examiner—Donald J. Arnold
Attorney, Agent, or Firm—John J. Swartz

[57] ABSTRACT

Apparatus for fabricating a prefinished wallboard wherein a layer of settable material is applied to one side of a wall panel and a decorative pattern is formed in relief in the settable material which, when set, is harder than the wall panel. A decorative coating may be applied to the relieved portions of the moldable material, and reinforcing and insulating members may be connected to the opposite side of the panel.

8 Claims, 9 Drawing Figures

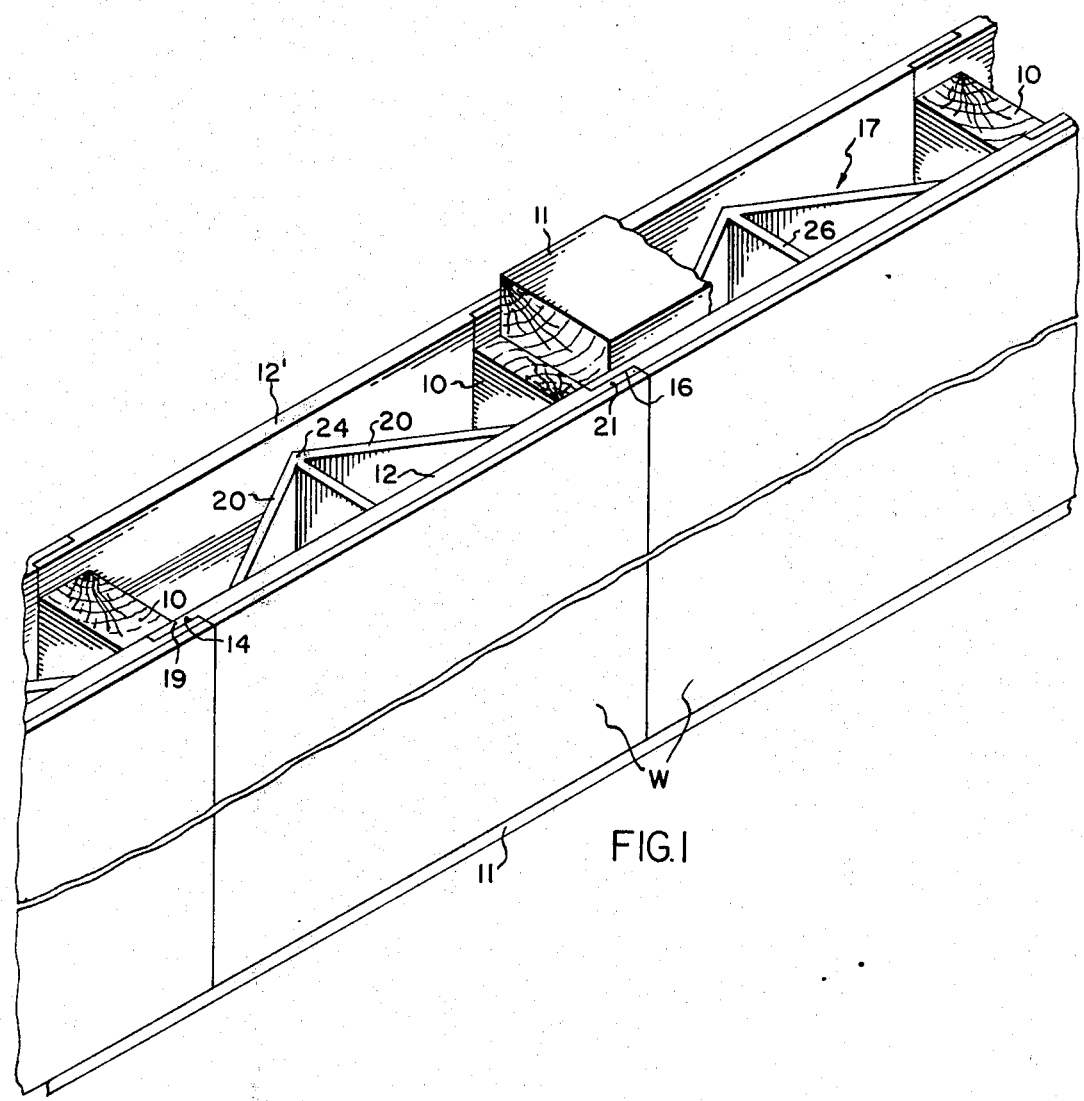
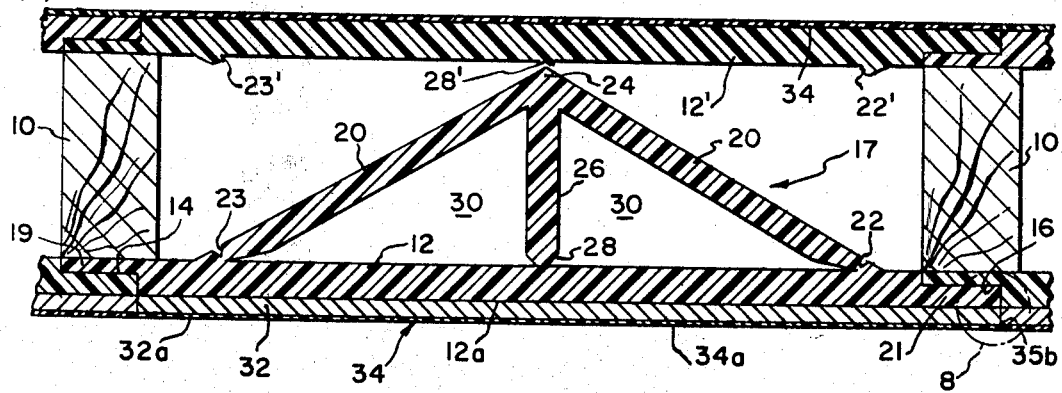

APPARATUS FOR MANUFACTURING PREFINISHED WALLBOARD

This is a division of application Ser. No. 450,281 filed in the United States Patent Office on Mar. 12, 1974, which is a divisional application of prior application Ser. No. 237,345 filed in the patent office on Mar. 23, 1972, now U.S. Pat. No. 3,798,854.

FIELD OF THE INVENTION

This invention relates to apparatus for making a prefinished wallboard having a coating of settable material, with a decorative pattern formed in relief therein, the coating being substantially harder than the wall panel.

BACKGROUND OF THE INVENTION

In the conventional construction of exterior building walls, a layer of thermal insulating material is installed between the inner and outer wall surfaces. The cost of separately installing individual layers of insulation is exorbitant.

Interior wall surfaces generally are constructed of plaster or pressed board which may be decorated by papering or painting. Occasionally, the plaster is swirled to provide a decorative effect. Such painting and papering requires the expenditure of substantial manual labor which is relatively expensive. Although the advent of wood paneling has provided some variety in interior, decorative walls, builders, architects, and decorators are limited in their choice of interior walls.

It is yet another object of the present invention to provide an improved apparatus for forming a prefinished wallboard including a wall panel with a planar surface covered with a decorative coating having pattern forming recesses therein of a depth less than the thickness of said coating and having a contour different from the contour of the panel.

The exterior surfaces of conventional wood panel wall constructions are also easily scratched and marred and require refinishing after limited use. Accordingly, it is another object of the present invention to provide apparatus for forming a wallboard including a wall panel covered with settable material which has a pattern formed in relief therein and which is substantially harder when set than the wall panel so as to be scratch resistant.

It is a further object of the present invention to provide wallboard fabricating apparatus which includes a rotatable pattern-forming drum having pattern-forming projections thereon for forming a relief pattern in settable material covering one side of a panel and apparatus for thereafter applying a decorative coating only to the non-relieved portions of the settable material.

Other objects and advantages of the present invention will become apparent from the following description.

SUMMARY OF THE INVENTION

Apparatus for forming plural substantially identical wallboards from preformed wall panels comprising mechanism for placing, over one side of each wall panel, a layer of moldable settable material which, when cured, will be harder than the wall panel; a rotatable drum for creating a plurality of recesses in each layer of moldable material to provide a pattern therein having a contour which does not follow the contour of said one side of said wall panel; the rotatable drum mechanism including mechanism for forming first and second relief portions in each layer, along both major side edges of each panel, with the first and second portions along each edge having different degrees of relief and the relief along transversely aligned portions of each wallboard are different, so that when one wallboard is installed laterally adjacent another wallboard, adjacent portions of the two wallboards are different.

The present invention may be more readily understood by reference to the accompanying drawings, in which:

FIG. 1 is a fragmentary, front, perspective view of a wall including wallboards constructed according to the present invention;

FIG. 2 is a greatly enlarged, longitudinal sectional view of the wall illustrated in FIG. 1;

THE WALLBOARD

Figure 4:
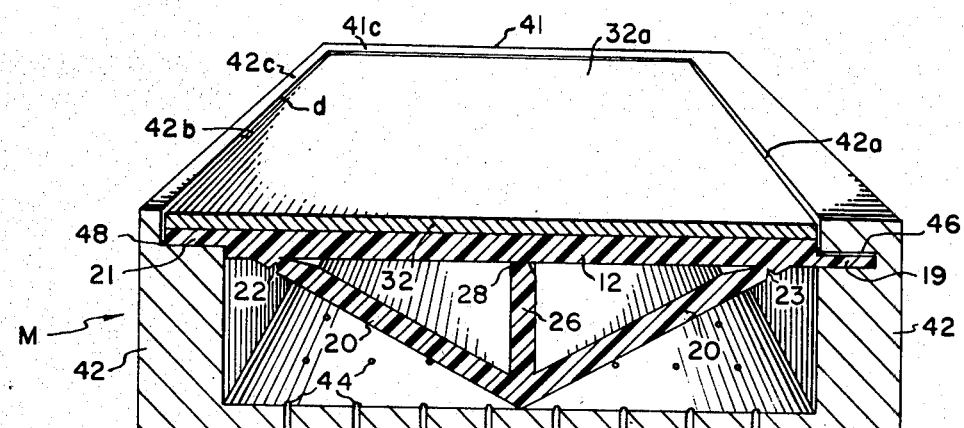
FIG. 4 is a greatly enlarged end perspective view of the mold in which a wall panel is supported during the wallboard construction.

A wallboard manufactured by apparatus constructed according to the present invention is designated generally by the reference character W and is particularly adapted to be mounted in side-by-side relation with identically constructed wallboards on a plurality of spaced apart, vertical wood stud members 10 mounted between vertically spaced, horizontal building headers 11 as usual. Each of the wallboards W includes a planar wall panel 12 spanning adjacent studs 10. Longitudinally extending recesses 14 and 16 are provided at the opposite edges of each panel 12 to define longitudinally extending tongues 19 and 21 which may be interfitted with the tongues of an adjacent panel 12.

Integrally formed with each panel 12 is a reinforcing and insulating section, generally designated 17, including a pair of rearwardly covering, integrally connected brace members 20 forming an apex 24 that is joined to a reinforcing rib 26 integrally joined to the midsection of the wall panel 12. The brace members 20 and the rib 26 are scored at 22, 23, and 28 to provide tear facilitating portions which permit the brace sections 20 and the rib 26 readily to be broken away from the wall panel 12. The brace members 20 extend the length of the panel 12 and cooperate therewith to define "dead air" spaces 30 therebetween to increase the insulating characteristics of the wallboard W. The wall panel 12 and the bracing and insulating section 17, may comprise foamed polyurethane, foamed polystyrene, glass fiber board, or cork board. A lightweight, non-burning, foamed polyurethane of the type sold under the trademark "POLYLITE" and having a density of 1.8-2.5 pounds per cubic foot is relatively strong and has been found suitable for this purpose.

A wall strengthening sheet 32 of gypsum-based building material, such as "Sheet Rock", is secured to the surface 12a of the wall panel 12 with suitable adhesive to strengthen the wall panel construction. A layer or coating, generally designated 34, of settable plastic material is cast on the smooth, continuous, uninterrupted outer face surface 32a of the strengthening sheet 32 and comprises a mixture of quickly settable polymer resin, a filler of fibrous material such as paper-mache which strengthens the resin, and pigment containing water base paint. It has been found that resin such as that sold under the trademark "LIQUITEX" is suitable for this purpose. A suitable mixture may comprise five gallons of pulverized chips and threads of paper, two gallons of water base paint, and one quart of the "LIQUITEX" resin. The admixture is spread evenly on the outer surface 32a and recessed or non-relieved portions 35 are formed in the outer surface 34a of the moldable material 34 to cooperate with the relieved or raised portions 36 to provide a pattern presenting an ornamental effect pleasing to the eye. It is important to note that the recesses 35 are of a depth less than the thickness of the coating 34 and that the contour of the surface 34a, as relieved, does not follow the contour 32a of the strengthening sheet. A layer 37 of primer paint is applied to the outer surface of the moldable, settable material 34 after it has at least partially set, and then a final coating 38 of paint is applied only to the portions of layer 34 covering the raised portions 36 of the settable material 34.

If the strengthening sheet 32 is omitted from the construction, the material 34 is applied to the surface 12a of the wall panel 12. The settable material 34, when set, is substantially harder than either the strengthening sheet 32 or the wall panel 12 to provide an outer surface 40 which is relatively impregnable to objects normally found in the home or office.

The panel members 12 are glued or nailed to the wall studs 10 and adjacent ones of the panel members are connected by the overlapping tongues 19 and 21. The wallboards W provide a relatively lightweight, well insulated, wall construction, having a relatively impregnable outer surface. The wallboards W are sufficiently strong to form a sturdy wall which may be used in new construction or to remodel or refinish existing structures, such as basements and the like.

The bracing portions 17 occupy a large portion of the space between the studs 10 such that they would interfere with the bracing portions of a wallboard W attached to the opposite sides of the studs 10. In constructing the wall, the buttress or reinforcing members 20 of one wallboard W are broken away, as illustrated at 22', 23' and 28' (FIG. 2), to leave only the wall panel 12' and the layer of hardened material 34.

THE METHOD AND APPARATUS FOR MANUFACTURING THE WALLBOARD

Figure 3:
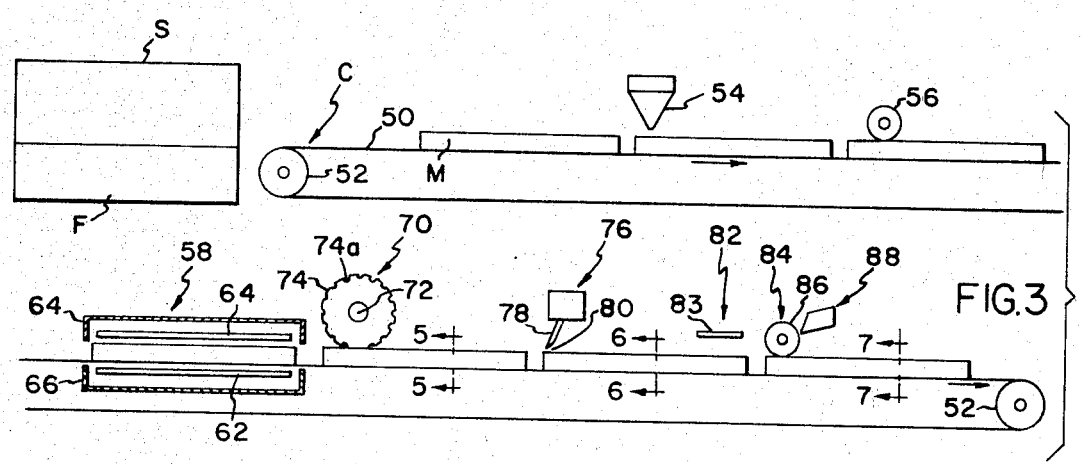
FIG. 3 is a somewhat diminished, side elevational view of apparatus utilized to construct a wallboard.

The wall panel member 12 and the wall reinforcing and insulating members 20 and 26 are integrally molded at a molding machine, generally designated S (FIG. 3), which is supported on a frame, generally designated F, and comprises a partible or collapsible mold easily separated from the molded product. The integrally formed wall panel member 12 and reinforcing insulating members 20 and 26 are placed in a panel supporting carriage or mold, generally designated M (FIG. 4), including a bottom wall 40 having a pair of upstanding side walls 42 for supporting the wall panels 12. The bottom mold wall 40 includes a plurality of openings 44 therethrough for passing heated air as will be described more particularly hereinafter.

One of the panel supporting side wall members 42 of the mold M includes a longitudinal enlarged slot 46 for receiving one tongue 19 of a panel 12 and the opposite mold side wall 42 is recessed at 48 to support the other panel tongue member 21. The strengthening sheet 32, if used, may be secured to the panel 12 either before or after the panel 12 is placed in the mold M. It should be noted that when the wall panel 12 and the strengthening panel 32 are received in the mold M, in the position illustrated in FIG. 4, the upper surfaces 41c and 42c of the mold side and end walls 41 and 42 are disposed a slight distance d (FIG. 4), i.e., 1/16 of an inch, above the upper surface 32a of the strengthening sheet 32 so that the settable, moldable material will be contained.

Figure 5:
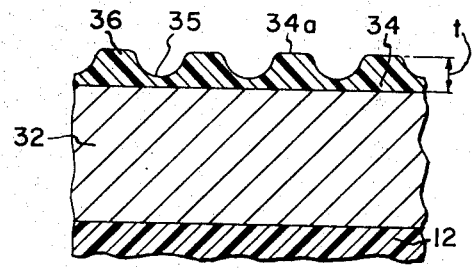
FIG. 5 is a greatly enlarged sectional view taken on the line 5—5 of FIG. 3 and illustrating the wall panel after the pattern has been formed in relief thereon.
Figure 6:
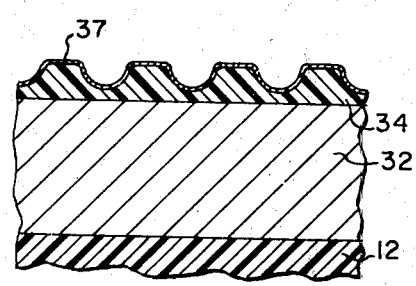
FIG. 6 is a greatly enlarged sectional view taken on the line 6—6 of FIG. 3 and illustrating the outer surface of the settable material after it has been covered with a layer of primer paint.
Figure 7:
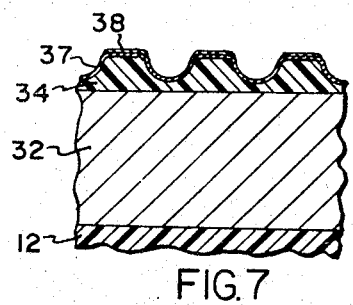
FIG. 7 is a greatly enlarged sectional view taken on the line 7—7 of FIG. 3 and illustrating the decorative material after an additional coating of paint has been applied to cover only the non-recessed portions of the settable material.

The panel supporting mold or carriage M is supported for movement in an endless path of travel by an endless conveyor, generally designated C, including an endless belt 50 trained around front and rear pulleys 52, one of which is driven by a suitable source of power such as an electric motor (not shown). Mounted above the conveyor belt 50 is a moldable material carrying hopper 54 which temporarily stores the previously described admixture of paper, paint, and resin and dispenses the admixture onto the outer face 32a of the strengthening sheet 32. A frame supported, moldable material spreading roller 56 is mounted above the conveyor belt 50 for spreading and distributing the moldable material 34 into a layer of substantially uniform thickness t (FIG. 5) covering substantially the entire outer face 32a of the strengthening sheet 32. The upper surface 34a is substantially flush with the top surfaces 41c and 42c of the side walls 41 and 42. The length of the roller 56 is substantially equal to the distance between the longitudinally parallel portions 42a and 42b of the upstanding mold walls 42 so that the moldable, settable material 42 is spread against the wall surfaces 42a and 42b.

From the hopper 54, mold M passes through a dryer, generally designated 58, which comprises upper and lower electric heating elements 60 and 62 mounted on upper and lower frame supported housings 64 and 66, respectively. Suitable fans (not shown) are provided in the dryer 58 for blowing air over the heating coils 60 and 62 to deliver warm, drying air to the top and bottom sides of wallboard W, via the openings 44, to partially set the settable coating 34. As the material 34 partially sets, it laterally shrinks away from the inside surfaces 42a and 42b of the mold walls 42.

From the dryer the panel supporting mold M passes under a frame supported, freely rotatable, pattern forming drum, generally designated 70, which is rotatable about its axis 72 and includes positive pattern-forming circumferentially spaced, raised projections 74 on its outer surface to form recesses 35 in the moldable material 34. The relieved or raised portions 36 of the coating 34 are received in recessed portions 74a provided in the outer circumferential surface of the drum interjacent the raised projections 74.

The length of the pattern forming drum 70 substantially equals the distance between the side wall portions 42a and 42b of the mold M. The outer surface of the pattern forming drum 70 is disposed in the path of the partially set material 34, so as to be driven about the axis 72 by the partially set material 34 moving with the mold M along the upper run of the conveyor C. The raised portions 74 on the pattern forming drum 70 create the recessed portions 35 in the moldable material 34 to provide the desired relief pattern. The circumference of the pattern forming roller 70 substantially equals the length of the panel 12 so that the roller will traverse the entire surface 34c of the moldable material each revolution.

Figure 8:
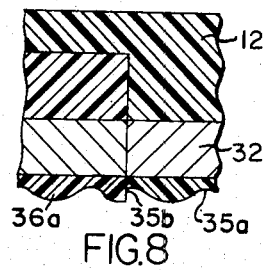
FIG. 8 is a greatly enlarged, longitudinal sectional view of the abutting panel portions encircled in FIG. 2 and identified by the reference numeral 8.

The surface at one end of the drum includes alternately circumferentially spaced, raised and recessed edge portions which are in axial alignment with recessed and raised edge portions, respectively, at the other end of the drum. The alternately circumferentially spaced raised and recessed portions form edge recesses 35a and raised areas 36a at opposite edges of each panel. The raised portion 36a will cast a shadow on the relieved portion 35a of an adjacent panel to provide a visual camouflage of the seam 35b (FIGS. 1 and 8) therebetween. One circumferential edge portion of the drum can be entirely raised and the other circumferential edge portion be entirely recessed so that one entire lateral wallboard edge is recessed while the other entire lateral edge is not recessed. As the wallboard W is passed under the relieving roller 70, the roller 70 will again spread the partially set material 34 laterally outwardly against the inside surfaces 42a and 42b of the mold 42.

If a design is to be repeated several times on each panel, a smaller diameter roll than that described above could be used. It also should be understood that additional pattern forming rolls could be utilized to imprint or paint only the relieved, or non-recessed portions 36 of the moldable material 34 with a finer pattern if desired. The pattern forming roller 70 may be raised and lowered to and from operative pattern forming position by appropriate hydraulically operated cylinders (not shown) to vary the pressure exerted on the settable coating 34.

Frame supported, paint spraying apparatus 76 is disposed downstream of the pattern forming roller 70 and includes a spray nozzle 78 for spraying primer paint 80 on the outer surface 34a of the set material 34 to provide a light coating 37 covering both the recessed and non-recessed portions 35 and 36 of the material 34.

Drying mechanism, generally designated 82, is provided downstream of the spraying mechanism 76 and includes an electric heating element 83 disposed above the conveyor C for drying the layer 37 of primer paint. Disposed downstream of the drying element 82 is a second paint station 84, including a continuously revolving paint drum or squeegee roller 86 having its outer surface continuously supplied with paint from a paint supply assembly 88. The paint applying squeegee roller 86 is disposed in the path of the raised portions 36 of the settable coating 34 to be driven thereby as the wallboard W moves with the mold M along the upper run of the conveyor C. The roller 86 engages only the raised portions 36 of the moldable material 34 and does not pass into the recessed portions 35 so that an additional layer 38 of paint is applied only to the raised portions 36 of the partially set material 34 to provide the appropriate decorative effect. The material 34 and the layers 37 and 38 of paint are then permitted to set and harden to provide a prefinished wallboard having a substantially impregnable, scratch resistant, outer surface. As the material 34 sets, it bonds to the outer surface 32a of the strengthening panel 32. The prefinished wallboards W are installed side-by-side on the studs 10 and overlap the adjacent wallboards to create the appropriate decorative effect.

By appropriately selecting different designs 74 on different pattern-forming drums 70 so as to provide a plurality of wallboards with different individual patterns, the individual prefinished wallboards can be assembled to provide a composite mural easily installed at a relatively low cost to the homeowner.

Figure 9:
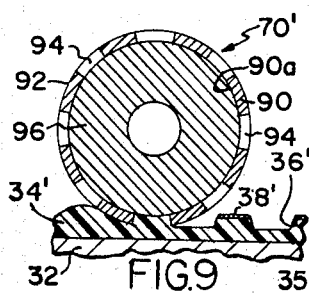
FIG. 9 is a sectional side view of a combined pattern-forming and decorating roll which can be used to simultaneously form the pattern and decorate the non-recessed portion of the settable material.

Referring now to FIG. 9, a substitute pattern forming roller, generally designated 70', is disclosed and comprises a hollow cylinder 90 having a surface 92 for creating the recesses 35' in the settable material 34'. A plurality of recesses 94 are provided in the cylinder 90 for receiving the raised portions 36' of the settable material 34'. A porous, paint applying, squeegee roller or cylinder 96 is snugly, slidably received in the bore 90a through the cylinder 90 for applying a coating 38' of paint to the raised portions 36' simultaneously with their formation by the cylinder 90. Paint is supplied to squeegee roller in any suitable manner from a paint source (not shown). If the roller 70' is utilized, the paint applying roller 86 (FIG. 3) can be eliminated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. Apparatus for forming plural substantially identical wall boards from preformed wall panels comprising:
   means for placing, over one side of each said wall panel, a layer of moldable, settable material which, when cured, will be harder than said wall panel;
   rotatable drum means for creating a plurality of recesses in each layer of moldable material to provide a pattern therein having a contour which does not follow the contour of said one side of said wall panel;
   said creating means including means for forming first and second relieved portions in each said layer, along both major side edges of each said wall panel, with the first and second portions along each said edge having different degrees of relief and the relief along transversely aligned portions of each said wall board are different, so that when one said wall board is installed laterally adjacent another said wallboard adjacent portions of the two wall boards have different reliefs.

2. The apparatus set forth in claim 1 wherein said rotatable drum means includes means for engaging said moldable material with a rotatable molding drum and means for rotating said drum about its axis while relatively moving said drum and said wall panel; and further including means for engaging said non-recessed portions with a rotatable, coating applying drum and rotating said last-mentioned drum about its axis while relatively moving said last-mentioned drum and said wall panel.

3. The apparatus as set forth in claim 1 wherein said rotatable drum means includes means for providing recessed and non-recessed portions in the outer surface of the moldable, settable material and forcing said material laterally outwardly; and further including means for decorating said material by applying a liquid decorative coating to the material; means for drying the liquid decorative coating; said means for applying said coating including means for applying an additional layer of liquid decorating material to the non-recessed portions only of said material.

4. The apparatus as set forth in claim 3 including a a panel mounting carriage having air passages in the underside thereof and lateral side edge portions; means for blowing air through said openings against the underside of said panel to at least partially cure said moldable settable material.

5. The apparatus as set forth in claim 4 wherein said mounting means includes means for mounting said panel at a level below the upper level of said adjacent side edges portions of said carriage, said drum means including means for spreading said material to a level flush with said side edge portions of said carriage.

6. The apparatus set forth in claim 1 wherein said drum means comprises a hollow rotatable drum, having a plurality of apertures therethrough for receiving portions of said moldable material; and paint applying means disposed within said drum for applying a coat of paint to the terminal ends of said portions received by said apertures.

7. The apparatus set forth in claim 6 including means upstream of said creating means, for partially curing said moldable material to laterally shrink said material; and means, downstream of said creating means, for finish curing said moldable material so that it will set and harden.

8. The apparatus set forth in claim 1 wherein said rotatable drum means includes circumferential end edges each comprising alternately circumferentially spaced, raised and recessed edge portions which are in axial alignment with recessed and raised edge portions respectively, at the opposite end edge.

* * * * *